United States Patent [19]
Jessop

[11] Patent Number: 4,786,946
[45] Date of Patent: Nov. 22, 1988

[54] PAPER DELIVERY SYSTEM FOR PHOTOGRAPHIC PRINTER

[75] Inventor: Thomas C. Jessop, Webster, N.Y.

[73] Assignee: Eastman Kodak Company, Rochester, N.Y.

[21] Appl. No.: 146,657

[22] Filed: Jan. 21, 1988

[51] Int. Cl.$^4$ .................... G03B 29/00; G03B 27/32
[52] U.S. Cl. ........................... 355/28; 355/77
[58] Field of Search ................ 355/28, 29, 77

[56] References Cited

U.S. PATENT DOCUMENTS

| | | | |
|---|---|---|---|
| 3,460,453 | 8/1969 | Gold | 355/28 X |
| 3,467,469 | 9/1969 | Hastings et al. | 355/28 X |
| 3,536,401 | 10/1970 | Mason et al. | 355/28 |
| 3,746,444 | 7/1973 | Kahle et al. | 355/28 |
| 4,076,411 | 2/1978 | Crayton et al. | 355/28 |
| 4,298,272 | 11/1981 | Stievenart et al. | 355/28 |
| 4,408,872 | 10/1983 | Vaughan | 355/28 |
| 4,451,141 | 5/1984 | Thebault | 355/28 |
| 4,547,065 | 10/1985 | Thebault | 355/28 |
| 4,618,255 | 10/1986 | Miyasaka et al. | 355/28 X |

Primary Examiner—Richard A. Wintercorn
Attorney, Agent, or Firm—Robert H. Sproule

[57] ABSTRACT

Photographic paper (20) is delivered from a supply roll (14) in a cassette (15) in a printer (10) where variable lengths of the paper web are cut off as sheets (30) that are imaged and processed. Cassette (15), in its delivery position, is light locked to a hood (40) and to a fixed blade (26) of a cut-off knife (25). The movable blade (27) of the cut-off knife (25) has a movable portion (44 or 64) that overlaps with a fixed portion (45 or 63) of a labyrinth light lock that is closed whenever movable knife blade (27) is closed. This blocks sheet imaging light from the leading end (21) of the paper (20) on the supply side of cut-off knife (25) when shutter (32) opens for imaging sheet (30). Shutter (32) then closes, allowing knife (25) to open for advancing another length of paper (20) and cutting off a subsequent sheet (30) for imaging another print.

25 Claims, 4 Drawing Sheets

PAPER DELIVERY SYSTEM FOR PHOTOGRAPHIC PRINTER

BACKGROUND OF THE INVENTION

1. Field of the Invention

This invention involves delivering photographic paper to a printer and cutting sheets from an advanced web of the photographic paper so that the sheets can be imaged in the printer and processed to produce prints.

2. Description of the Prior Art

A photographic printer capable of producing different sized prints from a photographic negative preferably has photographic paper delivered from a continuous web that is cut to the desired size sheet for each print. Thebault U.S. Pat. No. 4,547,065 suggests such a printer in which an advanced length of a paper web is imaged and then cut off to drop into a paper processor. The Thebault device advances the paper web downwardly over a fixed knife blade that blocks light from the supply cassette and forms a border for the image projected onto the advanced web. Then a movable blade of the knife closes against the fixed blade to cut off the imaged sheet, which drops by gravity into the paper processor.

Changing the size of the image and the cut-off sheet for the Thebault printer requires moving the optical axis of the projection system relative to the fixed knife blade, which acts as an image boundary and light lock for the unadvanced paper. The security of the light lock attained by the emulsion side of the paper web resting, without backup pressure, against the fixed knife blade is also problematic.

I have devised a printer that cuts off a variable length sheet from an advanced photographic paper web and then moves the cut-off sheet via a vacuum platen to center the sheet on the optical axis of a fixed projection printer. This allows variation in the length of the cut-off sheet simply by varying the drive distance of the paper advance and the vacuum platen, without moving the optical axis of the printer. I have also devised a light lock system that reliably blocks light from the unexposed paper behind the cut-off knife, while the cut-off sheet is imaged. This ensures that imaging light from the printer does not fog the leading region of a subsequent sheet.

In my printer, the light locking, sheet cut-off, and sheet advancing, imaging, and processing devices all cooperate to allow economical and reliable variation in cut-off sheet size and reliable light locking during sheet imaging. These advantages are especially important in a customer-operated printer that responds readily to requests for different sizes of prints.

SUMMARY OF THE INVENTION

My photographic paper delivery system applies to a printer having a cassette that advances a supply roll of photographic paper along a paper path leading into the printer between the fixed and movable blades of a cut-off knife. A hood for the printer is disposed opposite the fixed knife blade, and light locks are formed between the hood and the paper cassette and between the fixed knife blade and the cassette, when the cassette is in its delivery position. A fixed portion of a labyrinth light seal is formed around the paper path, and a movable portion of the labyrinth light seal is arranged on the movable knife blade so that the labyrinth light seal is closed whenever the movable knife blade is closed. A platen advances a cut-off sheet of paper from the knife to the optical axis of the printer where the cut-off sheet is imaged, and a shutter blocks light from the sheet exposure region except when the cut-off knife and the labyrinth seal are closed.

I prefer that the movable knife blade be driven by a cable attached to the free end of the knife blade and extending around a drive pulley turned by a motor. I also prefer that an idler roll confront the paper-moving platen in the region of the movable knife blade for holding a cut-off sheet against the platen as the movable knife blade closes. The paper path through the cut-off knife and along the platen is preferably horizontal in my printer, and I prefer that the fixed knife blade confront the backside of the paper and that the movable knife blade confront the emulsion side of the paper.

DESCRIPTION OF THE PREFERRED EMBODIMENT

Figure 1:
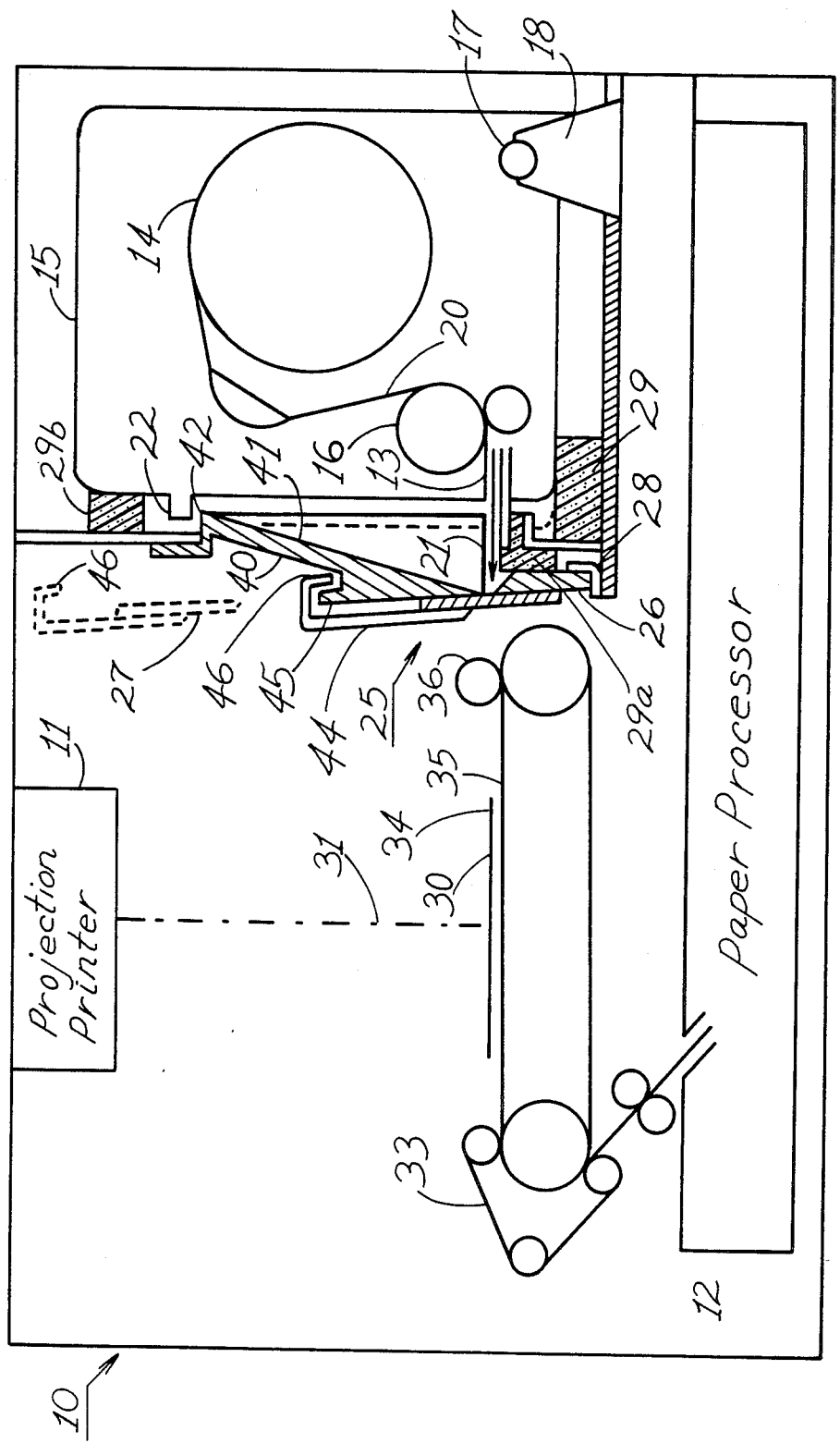
FIG. 1 is a schematic and partially cross-sectioned view of a preferred embodiment of my printer, the features selected for illustration in the drawing being arranged to emphasize my paper delivery system.
Figure 2:
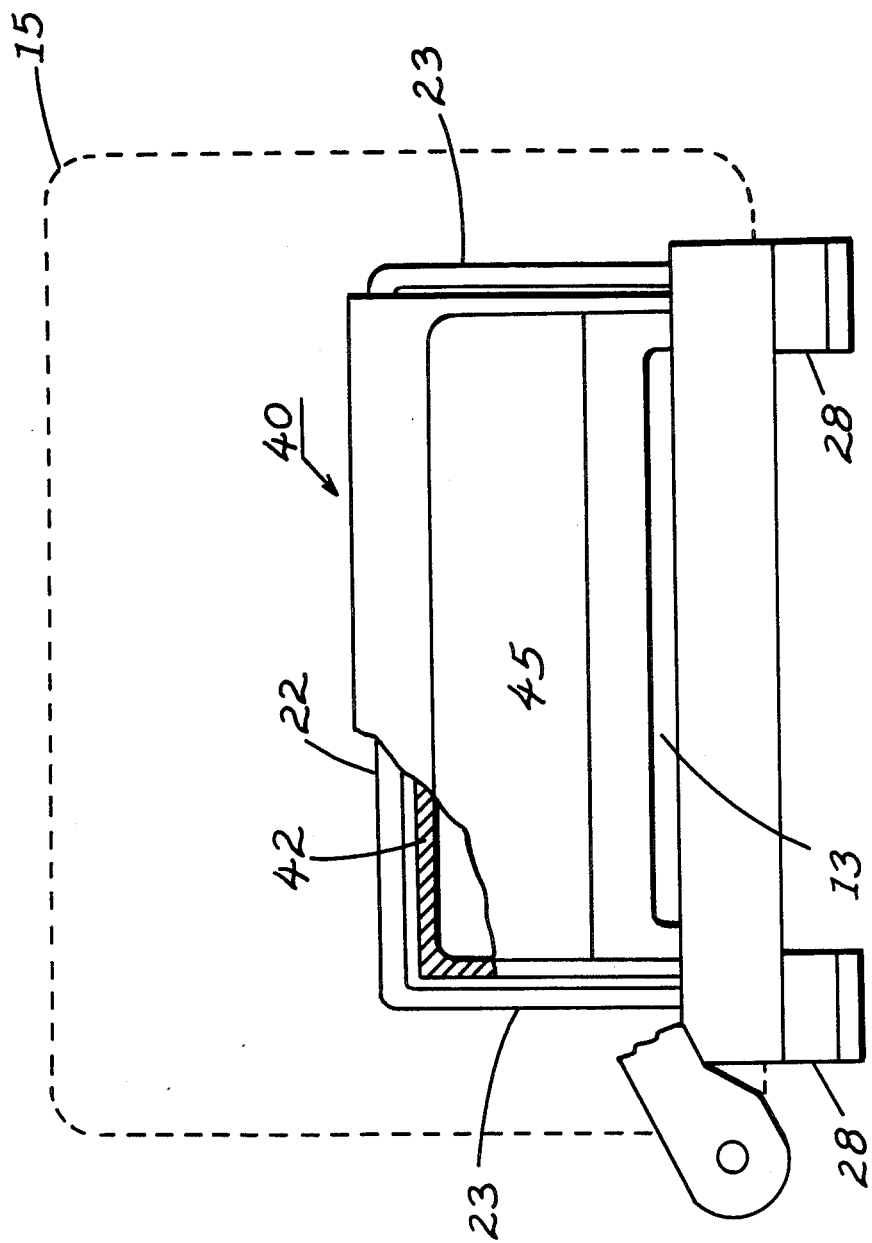
FIG. 2 is a partially schematic, elevational view, transverse to the paper path and taken in the plane of the cut-off knife with a wall in front of the paper cassette removed, to show the fixed knife blade, the printer hood partially cut away, and the cassette of the paper delivery system of FIG. 1.

My printer 10 includes a projection printer 11, a paper processor 12, and a paper supply cassette 15. A supply roll 14 of photographic paper 20 is advanced from cassette 15 through a slot 13 that is light locked to keep light away from unexposed paper within cassette 15. A short way beyond discharge slot 13, a cut-off knife 25 cuts a sheet 30 from an advanced region of paper web 20. The cut-off sheet 30 is held and moved by vacuum platen 35 to a position centered under the optical axis 31 of projection printer 11. There sheet 30, while lying in the image plane provided by vacuum platen 35, is imaged by opening of shutter 32. This occurs only when cut-off knife 25 is closed, as explained more fully below. The imaged sheet 30 then advances through a turn-around 33 and into paper processor 12, which is preferably arranged below printer 11 and cassette 15.

A feed mechanism 16, operated within cassette 15, is arranged for advancing variable lengths of paper web 20 through cassette slot 13. When cut-off knife 25 is opened, and shutter 32 is closed, and the lamp for projection printer 11 is extinguished, the leading end 21 of paper web 20 can advance beyond cut-off knife 25 and onto platen 35 under idler roller 36. When a suitable length of paper 20 has been advanced onto platen 35 by feed device 16, cut-off knife 25 closes, cutting off a trailing end 34 of sheet 30, which is held against platen 35 by idler roller 36, during the cut-off process. Then with cut-off knife 25 remaining closed, sheet 30 is advanced by platen 35 to the imaging position on optical axis 31.

Cut-off knife 25, on a mount 28, includes a fixed blade 26, preferably positioned against the back or underside of paper web 20, and a movable blade 27, preferably pivoting up and down against the upper or emulsion face of paper web 20. Cassette 15 is light locked to fixed blade 26 below paper slot 13, as schematically shown by strips of resilient and compressible foamed resin material 29 and 29a, arranged to engage lower front regions of cassette 15, in its delivery position, shown in FIG. 1. Cassette 15 preferably pivots into and out of the illustrated delivery position on a schematically shown pivot axis 17 turning on a support 18 within printer 10.

A hood 40 is arranged within printer 10 above paper web 20 in the region of movable knife blade 27. Hood 40 has a curved surface 41 matching the pivotal path of the cut-off leading end 21 of paper 20 as cassette 15 pivots in and out of the illustrated delivery position. This ensures that leading end 21 is not caught on something, to pull unexposed paper 20 out of cassette 15, if cassette 15 pivots out of its delivery position.

Hood 40 also has a ledge 42 on which a frame 22 of cassette 15 rests, in the delivery position. Frame 22 includes side elements 23 that extend along lateral sides of hood 40, and frame 22 is light locked to hood 40 in the delivery position of cassette 15, by compressible foamed resin, pile, or other expedients. Such a foamed resin strip 29b preferably engages an upper region of cassette 15, above frame 22, for light locking purposes.

The cutting direction of movable knife blade 27 agaisst fixed knife blade 26 is preferably angled a few degrees from the perpendicular to paper 20, as shown in broken and solid lines in FIG. 1, so that hood 40 can extend down to a region closely spaced above paper 20. The presence of hood 40 just above the path of paper 20 offers security against fingers reaching into the cutting region of knife 25. The slightly angled cutting plane of movable knife 27 allows it to slice in close to the bottom of hood 40.

A potential light leak around movable knife blade 27 is blocked by a labyrinth light lock that is closed whenever cut-off knife 25 is closed. There are several ways that this can be done; and in the alternative shown in FIG. 1, the labyrinth light lock includes an upstanding lip 45 formed on hood 40 and a downturned lip 46 on a light guard 44 arranged on movable knife blade 27. When movable blade 27 is closed, as shown in solid lines in FIG. 1, downturned lip 46 of light guard 44 overlaps with upturned lip 45 of hood 40 to block light from entering through any gap between movable knife blade 27 and hood 40. In the closed position, movable knife blade 27 also overlaps with fixed knife blade 26 to block light from reaching the underside of paper web 20. The leading edge 21 of web 20 then rests on the upper surface of fixed knife 26 against the cutting face of movable knife blade 27 with light blocked from reaching paper 20, on the supply side of cut-off knife 25, so long as movable knife blade 27 remains closed.

Figure 3:
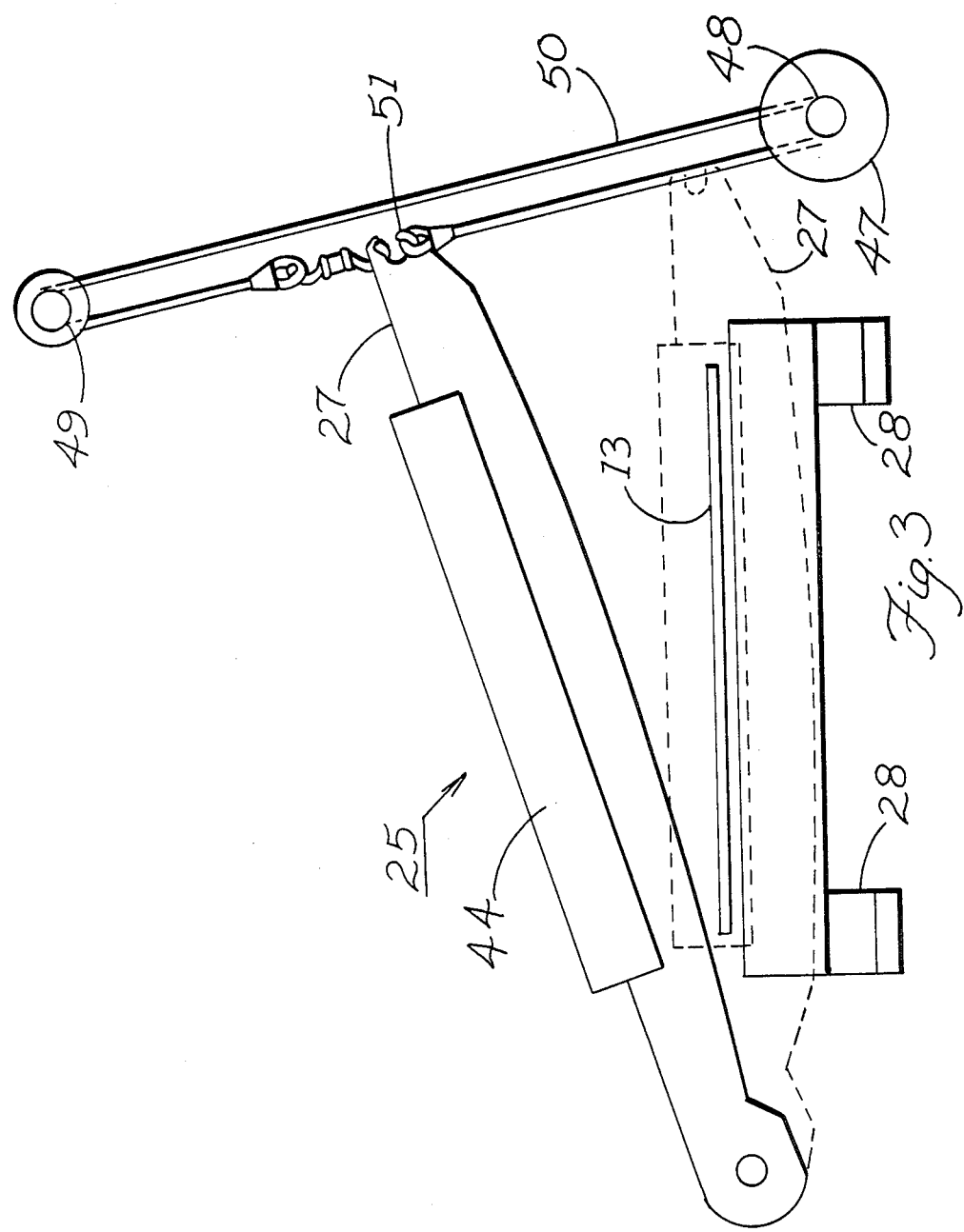
FIG. 3 is a partially schematic view, similar to the view of FIG. 2, but showing a preferred embodiment of my movable cut-off blade cooperating with the fixed knite blade.

I prefer a cable system for driving movable knife blade 27, as shown in FIG. 3. A motor 47 drives a pulley 48 to move a cable 50 around an idler pulley 49, and ends of cable 50 are connected to a free end 51 of movable knife blade 27. As the ends of cable 50 move up and down in response to motor 47, free end 51 of movable knife blade 27 also moves up and down in an arc that is accommodated by the ability of cable 50 to flex laterally between pulleys 48 and 49. In the open position, shown in solid lines in FIG. 3, movable knife blade 27 clears cassette paper delivery slot 13; and in the closed position, shown in broken lines in FIG. 3, movable knife blade 27 overlaps with fixed knife blade 26 and closes the labyrinth light lock provided by light guard 44, as explained above.

Figure 4:
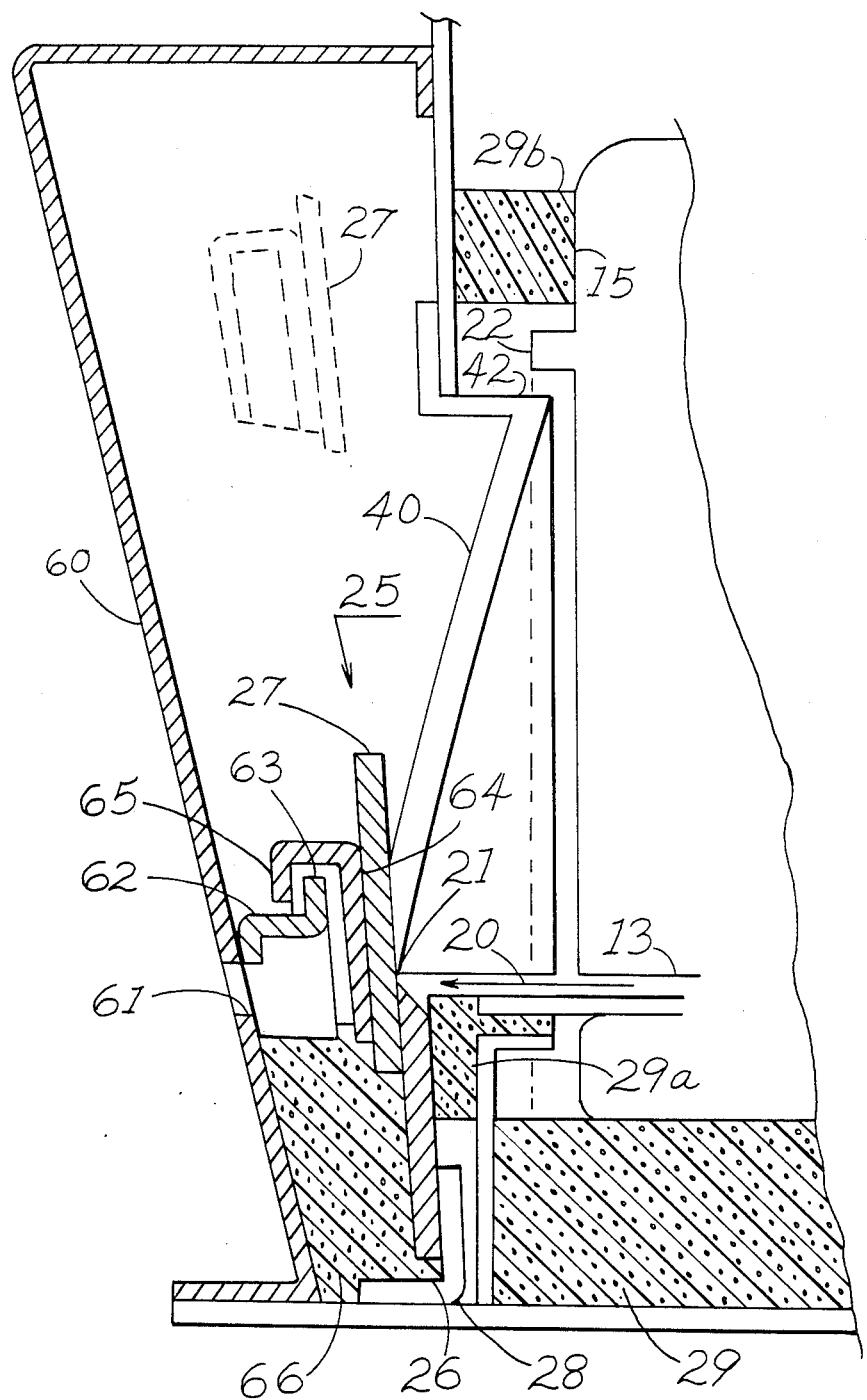
FIG. 4 is a schematic and partially cross-sectioned view, similar to and enlarged from a portion of FIG. 1, and showing an alternative light locking arrangement involving a shield enclosing the movement path of the movable knife blade.

An alternative way of forming a labyrinth light lock closed by movable knife blade 27 is shown in the embodiment of FIG. 4, having a light shield 60 enclosing movable knife blade 27, throughout its path of movement. Shield 60 also extends around the paper path and is joined to printer 11 above and below an opening 61 through which paper 20 passes.

A labyrinth light seal, closed by closure of movable knife blade 27, is arranged between knife blade 27 and light shield 60, around the path of paper web 20. This labyrinth light lock includes a three-sided frame 62, secured to light shield 60, and having a lip 63 extending upward and outward around paper opening 61. A guard 64, having a corresponding three-sided shape, is secured to movable knife blade 27 and has a downward and inwardly turned lip 65 that overlaps with lip 63 when blade 27 is closed. This overlap blocks light from along the top and both sides of the paper path through opening 61.

Below opening 61, a block of compressible and resilient foamed resin material 66 is arranged against fixed knife blade 26 where it is engaged by the leading edge of movable knife blade 27, in a closed position. This blocks light along the bottom of blade 27 and along the edges of paper opening 61 so that no printer light can reach the supply side of cut-off knife 25.

The secure light locking of paper 20 behind cut-off knife 25, combined with variable advance of cut-off sheets 30 by vacuum platen 35 and printing light exposure only when knife 25 is closed, makes my paper delivery system both reliable and expedient. It can perform dependably in a printer 10 arranged for operation by customers who select the images and print sizes they desire.

I claim:

1. A photographic paper delivery system for a printer having a cassette containing a supply roll of said photographic paper and means for advancing said paper into said printer along a path extending between a fixed and a movable blade of a cut-off knife, said paper delivery system comprising:
   a. a hood of said printer disposed opposite said fixed knife blade, and light locks formed between said hood and said cassette, and between said fixed knife blade and said cassette, when said cassette is in a delivery position;
   b. a fixed portion of a labyrinth light seal being formed around said path, and a movable portion of said labyrinth light seal being arranged on said movable knife blade for closing said labyrinth light seal when said movable knife blade is closed over said fixed knife blade;
   c. a platen for advancing a cut-off sheet of said paper from said cut-off knife to an optical axis of said printer where said cut-off sheet is imaged; and
   d. a shutter blocking light from said optical axis except when said cut-off knife and said labyrinth seal are closed.

2. The system of claim 1 including an idler roller confronting said platen in the region of said movable knife blade for holding said cut-off sheet against said platen as said movable knife blade closes.

3. The system of claim 1 including a cable attached to a free end of said movable knife blade and driven around a drive pulley by a motor for opening and closing said movable knife blade.

4. The system of claim 1 wherein said fixed knife blade confronts a backside of said paper and said movable knife blade confronts an emulsion side of said paper.

5. The system of claim 1 wherein said cassette is pivotally movable from said delivery position, and said hood is curved to match pivotal motion of said cassette.

6. The system of claim 1 wherein said fixed portion of said labyrinth light seal is formed on said hood.

7. The system of claim 1 including a light shield enclosing said movable knife blade and extending around said path, and wherein said fixed portion of said labyrinth light seal is arranged on said shield.

8. The system of claim 1 including foamed resin aterial arranged adjacent said fixed knife blade to be engaged by a leading edge of said movable knife blade in said closed position.

9. A photographic paper sheet supply system for a photographic printer having a cassette containing a supply roll of said paper and means for delivering said paper along a paper path extending between fixed and movable blades of a cut-off knife, said supply system comprising:
 a. a platen arranged for moving a cut-off sheet of said paper from said knife to an image plane on an optical axis of said printer for imaging said cut-off sheet;
 b. a hood arranged opposite said fixed knife blade, and light locks arranged between said hood and said cassette, and between said fixed knife blade and said cassette when said cassette is in a delivery position;
 c. a movable portion of a labyrinth light lock arranged on said movable knife blade;
 d. a fixed portion of said labyrinth light lock arranged around said paper path adjacent said movable knife blade so that when said cut-off knife is closed, said labyrinth light lock is closed to block light from a supply side of said cut-off knife; and
 e. a shutter for said printer being opened for imaging said cut-off sheet only when said cut-off knife and said labyrinth light lock are closed.

10. The supply system of claim 9 wherein said fixed knife blade confronts a backside of said paper, and said movable knife blade confronts an emulsion side of said paper.

11. The supply system of claim 10 including an idler roller confronting said platen on said emulsion side of said paper to hold said cut-off sheet against said platen as said movable knife blade closes.

12. The supply system of claim 9 wherein said cassette is mounted for pivoting clear of said delivery position, and said hood is curved to match pivotal movement of said cassette.

13. The supply system of claim 9 wherein said movable knife blade is driven by a cable attached to a free end of said movable knife blade and driven around a drive pulley by a motor.

14. The supply system of claim 9 wherein said fixed portion of said labyrinth light lock is arranged on said hood.

15. The supply system of claim 9 including a light shield extending around said paper path and enclosing said movable knife blade throughout its range of movement, and wherein said fixed portion of said labyrinth light lock is arranged on said shield.

16. The supply system of claim 9 including foamed resin material arranged adjacent said fixed knife blade to be engaged by a leading edge of said movable knife blade in said closed position.

17. A method of advancing, cutting off, and delivering a sheet of photographic paper to a printer, said method comprising:
 a. advancing a web of said paper along a paper path from a supply cassette through a cut-off knife arranged at an entry to said printer;
 b. shuttering said printer to block light from a printing region of said printer while said cut-off knife is open;
 c. arranging a light-shielding hood on said printer adjacent a movable blade of said cut-off knife;
 d. light locking said cassette to a fixed blade of said cut-off knife and to said hood when said cassette is in a delivery position;
 e. arranging a movable portion of a labyrinth light seal on said movable knife blade, and a fixed portion of said labyrinth light seal around said paper path so that when said knife blade is closed, said labyrinth light seal blocks printer light from a supply side of said cut-off knife; and
 f. closing said movable knife blade to cut off said sheet and close said labyrinth light seal, and while said movable knife blade and said labyrinth seal are closed, advancing said cut-off sheet to said printing region and opening a shutter of said printer to image said sheet.

18. The method of claim 17 including operating said movable knife blade with a cable driven by a pulley turned by a motor.

19. The method of claim 17 including using a vacuum platen to advance said cut-off sheet to said printing region.

20. The method of claim 19 including using an idler roller confronting said vacuum platen on the same side of said paper as said movable knife blade to hold said paper against said platen as said movable knife blade closes.

21. The method of claim 17 including arranging said fixed knife on a backside of said paper and said movable knife on an emulsion side of said paper.

22. The method of claim 17 including pivoting said cassette into said delivery position, and curving said hood to match the pivot motion of said cassette as it enters said delivery position.

23. The method of claim 17 including arranging said fixed portion of said labyrinth light seal on said hood.

24. The method of claim 17 including arranging a light shield over the path of movement of said movable knife blade, and arranging said fixed portion of said labyrinth light seal on said shield.

25. The method of claim 17 including arranging a foamed resin material adjacent said fixed knife blade to be engaged by the leading edge of said movable knife blade, when closed.

* * * * *